(12) United States Patent
Harres

(10) Patent No.: US 7,840,145 B2
(45) Date of Patent: Nov. 23, 2010

(54) APPARATUS AND METHODS FOR NOISE-FEEDBACK CONTROLLED OPTICAL SYSTEMS

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 1311 days.

(21) Appl. No.: 10/608,281

(22) Filed: Jun. 27, 2003

(65) Prior Publication Data

US 2004/0264982 A1 Dec. 30, 2004

(51) Int. Cl.
*H04B 10/06* (2006.01)
(52) U.S. Cl. .................. 398/209; 398/202; 398/208; 398/210; 398/212; 398/213; 398/38
(58) Field of Classification Search ............... 398/38, 398/115, 157, 202–213; 399/286; 250/214; 372/29.021
See application file for complete search history.

(56) References Cited

U.S. PATENT DOCUMENTS

| | | | | |
|---|---|---|---|---|
| 4,805,236 | A | * | 2/1989 | Urala ........................ 398/202 |
| 5,119,679 | A | | 6/1992 | Frisch |
| 5,136,295 | A | | 8/1992 | Bull et al. |
| 5,222,166 | A | | 6/1993 | Weltha |
| 5,270,533 | A | * | 12/1993 | Pulice .................... 250/214 R |
| 5,295,212 | A | | 3/1994 | Morton et al. |
| 5,653,174 | A | | 8/1997 | Halus |
| 5,809,220 | A | | 9/1998 | Morrison et al. |
| 5,892,868 | A | | 4/1999 | Peck, Jr. et al. |
| 5,907,569 | A | * | 5/1999 | Glance et al. .......... 372/29.021 |
| 6,078,714 | A | | 6/2000 | Cavanaugh |
| 6,124,663 | A | | 9/2000 | Haake et al. |
| 6,128,112 | A | * | 10/2000 | Harres ......................... 398/38 |
| 6,222,660 | B1 | * | 4/2001 | Traa .......................... 398/213 |
| 6,259,542 | B1 | * | 7/2001 | Saunders ..................... 398/28 |
| 6,266,169 | B1 | * | 7/2001 | Tomooka et al. ............ 398/157 |
| 6,334,020 | B1 | | 12/2001 | Fujimori et al. |
| 6,369,897 | B1 | | 4/2002 | Rice et al. |
| 6,437,362 | B2 | | 8/2002 | Suzuki |
| 6,515,315 | B1 | | 2/2003 | Itzler et al. |
| 6,547,448 | B2 | | 4/2003 | Johnson et al. |
| 6,570,149 | B2 | | 5/2003 | Maruyama et al. |
| 6,577,419 | B1 | * | 6/2003 | Hall et al. .................... 398/115 |
| 6,795,657 | B1 | * | 9/2004 | Nakano ...................... 398/202 |
| 6,795,675 | B2 | * | 9/2004 | Fujita ......................... 399/286 |
| 2002/0114038 | A1 | * | 8/2002 | Arnon et al. ................ 359/145 |

\* cited by examiner

*Primary Examiner*—Li Liu

(57) ABSTRACT

Apparatus and methods for noise-feedback controlled optical systems are disclosed. In one aspect, an apparatus includes a receiver adapted to receive an optical signal and to convert the optical signal to a corresponding electrical signal, and a control circuit coupled to the receiver. The control circuit includes a monitoring component adapted to monitor a noise level of at least a portion of the electrical signal and to adjust a gain of the receiver based on the noise level. In an alternate aspect, an optical system includes a transmitter, a receiver, and a monitoring component adapted to monitor a noise level of at least a portion of the electrical signal and to adjust at least one of an amplification of the transmitter and a gain of the receiver based on the noise level.

25 Claims, 3 Drawing Sheets

APPARATUS AND METHODS FOR NOISE-FEEDBACK CONTROLLED OPTICAL SYSTEMS

FIELD OF THE INVENTION

The present disclosure relates to apparatus and methods for controlling optical systems, and more specifically, to noise-feedback controlled optical systems.

BACKGROUND OF THE INVENTION

Aerospace fiber optic applications present a difficult design challenge relative to other fiber optic applications due to the large number of bulkhead disconnects that may be required, and the relatively high attenuation that occurs at each of these bulkhead connectors. The high attenuation may be the result of the unique environment that the connectors operate in, especially with respect to vibration and electrical signal contamination. As a result, high-speed fiber optic networks using convention connection apparatus and methods may not be possible in some aerospace applications.

One conventional design technique that can improve the attenuation problem is to use an Avalanche Photodiode (APD) at connections of the optical system instead of a more conventional photodetector. The APD may provide internal gain that can result in several dB of signal-to-noise (S/N) improvement. This may be enough S/N improvement to make possible the use of several additional connectors. The additional S/N may also make possible the use of other lossy components, such as optical switches.

A difficulty of using the APD may arise, however, because the APD's characteristics exhibit variation with temperature. With limited temperature variation (e.g. within an office building), the temperature effects can be compensated by measuring the temperature and adjusting the high-voltage bias (and therefore the gain) on the APD to compensate. In some aerospace environments, however, the temperature of the APD can range from −40° C. to +100° C. Temperature compensation over such a wide range is generally quite difficult to achieve. Furthermore, there is a potential problem in such applications because the APD may be operated within a few volts of a breakdown voltage, and that breakdown voltage typically changes with temperature (part of the APD characteristics that change with temperature). APD breakdown, while not catastrophic, typically renders the device useless for communications until it is brought back (by reducing the bias voltage) into normal operation. Thus, a link relying on an APD for receiver detection will drop out when such breakdown occurs. Therefore, there is an unmet need for fiber optic systems that provide improved S/N performance in relatively demanding environments, particularly environments characterized by extreme temperatures, vibration and electrical signal contamination of the type which may exist in some aerospace environments.

SUMMARY OF THE INVENTION

The present invention is directed to apparatus and methods for noise-feedback controlled optical systems. Apparatus and methods in accordance with the present invention may advantageously provide improved signal output and improved optical system reliability.

In one embodiment, an apparatus includes a receiver adapted to receive an optical signal and to convert the optical signal to a corresponding electrical signal, and a control circuit coupled to the receiver. The control circuit includes a monitoring component adapted to monitor a noise level of at least a portion of the electrical signal and to adjust a gain of the receiver based on the noise level.

In an alternate embodiment, an optical system includes a transmitter adapted to transmit an optical signal, a receiver adapted to receive the optical signal and to output an electrical signal, and a monitoring component. The monitoring component is adapted to monitor a noise level of at least a portion of the electrical signal and to adjust at least one of an amplification of the transmitter and a gain of the receiver based on the noise level.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for noise-feedback controlled optical systems. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without several of the details described in the following description.

Generally, embodiments of apparatus and methods in accordance with the present invention provide noise-feedback controlled optical systems, including improved apparatus and methods for achieving photodiode gain control and optical amplifier amplification control. Such embodiments of the present invention do not require the measurement of temperature, and may provide for an increase in dynamic range, and a decrease in APD gain and/or optical amplifier amplification when the optical signal is high, as described more fully below.

Figure 1:
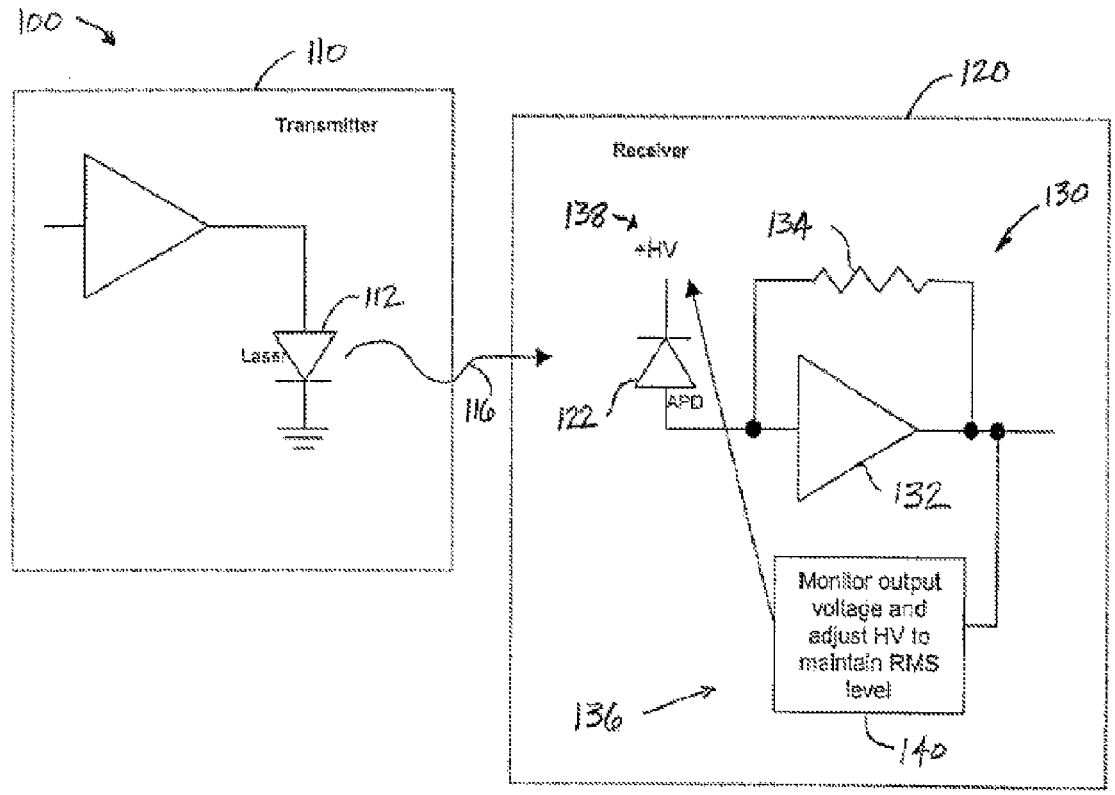
FIG. 1 is a schematic view of a fiber optic system including a control circuit in accordance with an embodiment of the present invention.

FIG. 1 is a schematic view of an optical system 100 in accordance with an embodiment of the present invention. In this embodiment, the optical system 100 includes a transmitter 110, and a receiver 120 that includes a photodiode 122. In a particular embodiment, the photodiode 122 is an avalanche photodiode (APD) 122. The transmitter 110 includes a light source 112 (e.g. a laser) that transmits an optical signal (not shown) via a fiber optic link 116 to the receiver 120.

As further shown in FIG. 1, the photodiode 122 is coupled to a control circuit 130. The photodiode 122 receives the optical signal from transmitter 110 and converts the optical signal into an electrical signal (not shown), and transmits the electrical signal to the control circuit 130. The control circuit 130 may include an amplifier 132 coupled in parallel with a resistor (or load) 134. A feedback loop 136 is coupled between an output of the amplifier 132 and an input voltage (HV) 138 of the photodiode 122. The input voltage (HV) 138 determines a gain of the photodiode 122. The feedback loop 136 includes a monitoring component 140 that is operable to monitor an output of the photodiode 122, and to adjust the input voltage 138 (i.e. the gain) of the photodiode 122 based on the monitored output. Preferably, the monitoring component 140 is operable to monitor a noise level in the electrical signal from the photodiode 122, and to adjust (increase and decrease) the input voltage 138 to maintain a desired noise level (e.g. a desired RMS value) output by the photodiode 122. It will be appreciated that the monitoring component 140 may monitor one or more portions of the electrical signal from the photodiode 122, or may monitor the entire electrical signal.

For example, in one embodiment, the general response of an APD photodiode 122 to light may be expressed as the following Equation (1):

$$I_T^2 = \underbrace{M^2 I_s^2}_{signal} + \underbrace{2qF(M)M^2 i_s B}_{signal\ shot\ noise} + \underbrace{2qF(M)M^2 I_{db} B}_{multiplied\ dark\ noise} + \underbrace{\frac{4kTB}{R}}_{resistor\ noise} + \underbrace{2qI_{ds} B}_{unmultiplied\ dark\ noise} \qquad (1)$$

where $I_T$ is the total current output of the APD 122, including noise, M is the APD internal gain, $I_S$ is the unmultiplied signal current, q is electronic charge, F(M) is the APD's excess noise factor, $I_{db}$ and $I_{ds}$ are the multiplied and unmultiplied dark current densities, respectively, k is Boltzmann's constant, T is absolute temperature, R is the receiver transimpedance, and B is the inverse of the data rate. Equation (1) is a known relation (e.g. see *Optical Communications* by M. J. N. Sibley, published by McGraw Hill, Equation 4.32).

The first term in Equation (1) is the electrical signal. The other four terms in Equation (1) are a signal shot noise, a multiplied dark noise, an amplifier noise, and an unmultiplied dark noise. All four terms contribute to the noise of the output electrical signal of the APD photodiode 122. All of the terms except the first term (the desired signal) and the second term (the signal shot noise) exist always. The first two terms exist only in the presence of light (that is, a data '1'). For low values of M the noise statistics are dominated by the last two terms of Equation (1). As M is increased and assuming that the signal current is much greater than the APD's multiplied dark current ($I_s >> I_{db}$), the noise variance during intervals of data '1's becomes significantly greater than the variance during data '0's.

Figure 2:
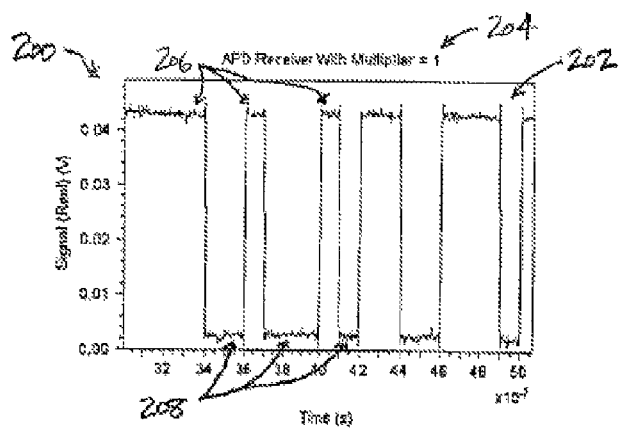
FIG. 2 is a graph of a first output waveform of a photodiode of the fiber optic system of FIG. 1 at a first gain value.
Figures 3, 4:
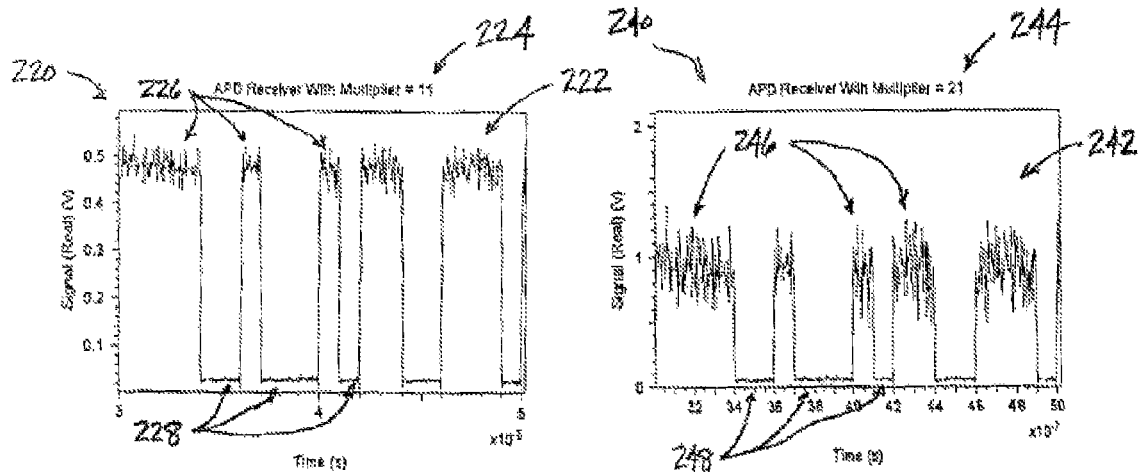
FIG. 3 is a graph of a second output waveform of the photodiode of the fiber optic system of FIG. 1 at a second gain value.
FIG. 4 is a graph of a third output waveform of the photodiode of the fiber optic system of FIG. 1 at a third gain value.

Example output electrical signals of the photodiode 122 are shown in FIGS. 2-4. Specifically, FIG. 2 is a graph 200 of a first output waveform 202 of the APD photodiode 122 of the optical system 100 of FIG. 1 at a first gain value 204. Similarly, FIGS. 3 and 4 show second and third output waveforms 222, 242 of the APD photodiode 122 at second and third gain values 224, 244, respectively. FIGS. 2-4 illustrate the emergence of noise in the bits corresponding to the presence of light as the APD photodiode 122 is increased. FIGS. 2-4 were created using an optical communications simulation tool called LinkSim commercially available from RSoft Design Group of Ossining, N.Y. In these simulations, a Vertical Cavity Surface Emitting Laser was used as a source which was launched into a multimode fiber and received by an APD connected to a transimpedance amplifier with 500Ω feedback.

As shown in FIG. 2, at a relatively low gain 204 (M=1), the noise of the electrical signal is dominated by the terms that are independent of the gain M 204 in Equation (1), so that the noise levels for the two signal states (i.e. light present 206 and light absent 208) are virtually identical. In FIG. 3, at the intermediate gain 224 (M=11), the multiplied noise of the second term in Equation (1) begins to emerge for high-state bits (i.e. light present 226). And in FIG. 4, at the relatively large gain 244 (M=21), the ratio of high-state (i.e. light present 246 or data '1') noise to low-state (i.e. light absent 248 or data '0') noise is quite large. FIGS. 2-4 demonstrate that a ratio of the noise (variance) in the two binary states of the data may provide a suitable discriminator for determining when the APD photodiode 122 is approaching a breakdown.

In one particular embodiment, by measuring instantaneous analog output from the photodiode 122 (or from the receiver 120), subtracting the mean (signal) from each such measurement, squaring the output, and integrating these measurements over a one-bit interval, a one-bit interval estimate of a noise energy for the particular state (high or low) may be obtained. Thus, estimates of noise energy for like states may be determined, and the ratio of these two energy estimates may be compared. When the ratio exceeds an established threshold, the monitoring component 140 of the control loop 130 of FIG. 1 may decrease the input gain 138 of the photodiode 122 so that the photodiode 122 stops increasing the gain of the optical signal from the transmitter 110. When the photodiode 122 (or receiver 120) output again calls for lower voltage bias HV (i.e. increased gain) rather than higher voltage bias, the control loop 130 may increase the input gain 138 accordingly.

Figure 5:
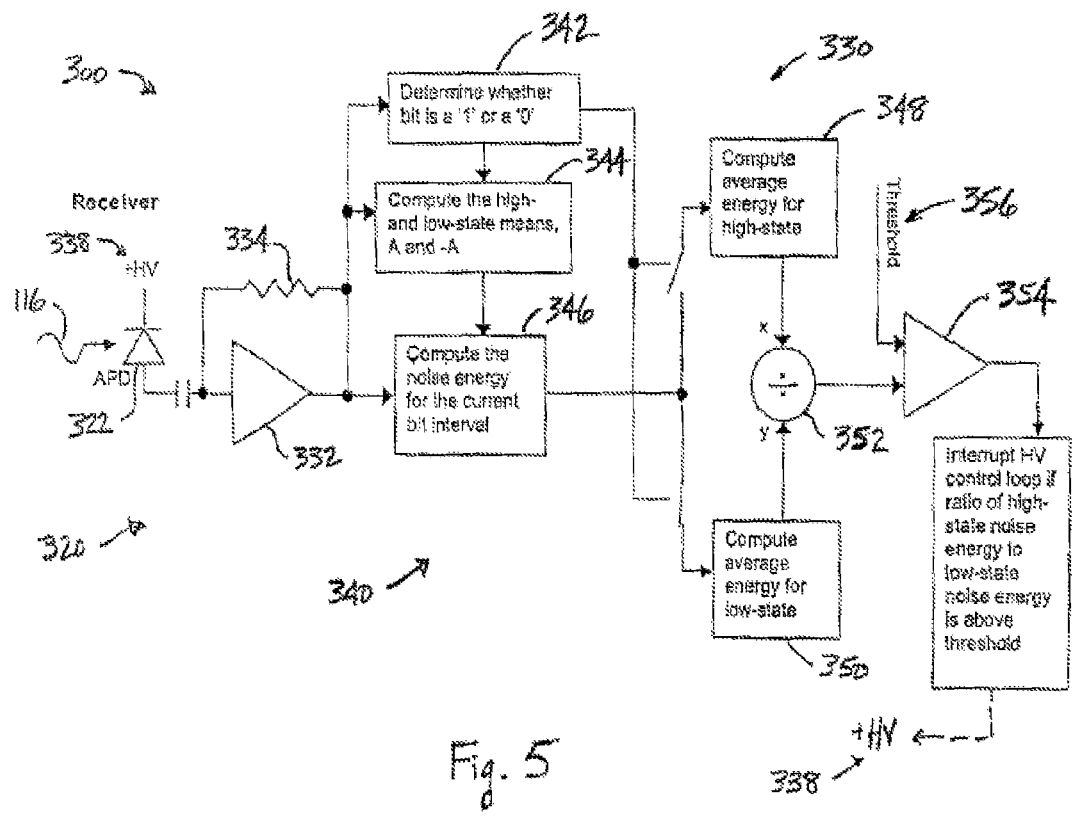
FIG. 5 is a block diagram of a receiver having a control circuit in accordance with an alternate embodiment of the present invention.

FIG. 5 is a block diagram 300 of a receiver 320 having a control circuit 330 coupled to an APD photodiode 322 in accordance with an embodiment of the present invention. In this embodiment, the control circuit 330 includes an amplifier 332 coupled in parallel with a resistor 334 to the APD photodiode 322, and a monitoring loop 140 coupled between an output of the amplifier 322 and the input gain 338 of the APD photodiode 322. A condition determining component 342 receives an electrical signal (not shown) from the APD photodiode 322 (via the amplifier 332) and determines whether the input signal indicates the presence or absence of light (i.e. whether input is '1' or '0').

A state means calculation component 344 may then compute the high- and low-state means (A and −A) of the electrical signal, and a noise energy calculation component 346 may compute a noise energy over the current bit interval. A high energy calculation component 348 may then compute an average energy for the high-state A, and a low energy calculation component 350 may compute an average energy for the low-state −A. A ratio component 352 may then calculate a ratio of the average energies for the high- and low-states A, −A, and transmit the calculated ratio to a comparator 354 which may compare the calculated ratio with a predetermined threshold 356. Based on the results of this comparison, the comparator 354 may adjust (increase or decrease) the input voltage 338 of the APD 322, or do nothing until a prescribed condition is satisfied. As described above, in a particular embodiment, when the ratio approaches or exceeds a threshold indicating that a breakdown voltage of the APD 322 is eminent, the comparator 354 may interrupt the input gain 338 to reduce the gain of the APD 322 to prevent breakdown of the APD 322 and possible interruption of the operation of the receiver 320. In a preferred embodiment, the comparator 354 interrupts the input gain 338 to the APD 322 when the calculated ratio equals or exceeds the predetermined threshold 356.

Figure 6:
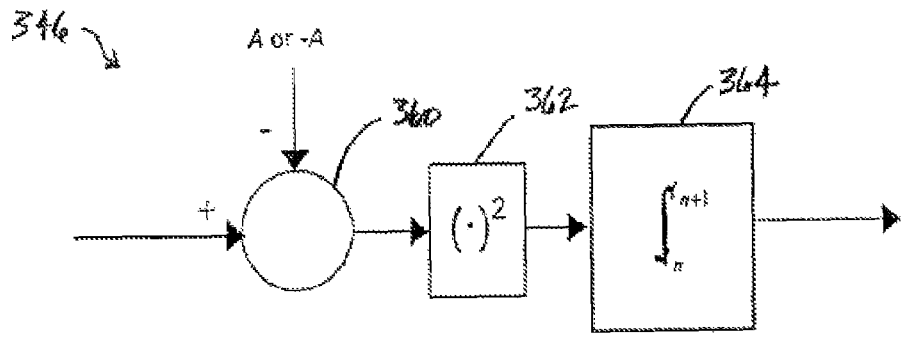
FIG. 6 is a schematic view of an embodiment of the noise energy calculation component of the control circuit of FIG. 5.

FIG. 6 is a schematic view of an embodiment of the noise energy calculation component 346 of the control, circuit 330 of FIG. 5. As shown in FIG. 6, the noise energy calculation component 346 includes a subtractor component 360 that receives the high- and low-state means from the state means calculation component 344. In one particular embodiment, +A is subtracted by the subtractor component 360 if other parts of the circuit determine that a logic '1' was sent, otherwise −A is subtracted. Next, a squaring function 362 squares the output from the subtractor component 360. In a particular embodiment, the squaring function 362 may be implemented using a device like the Model AD8362 TRUPWR® Detector commercially available from Analog Devices of Norwood, Mass. Finally, an integrate-and-dump circuit 364 receives the output from the squaring function 362 and integrates the output over the bit interval of bit n. In a particular embodiment, the integrate-and-dump circuit 364 can be implemented using the methods disclosed in U.S. Pat. No. 6,128,112 issued to Harres. In another embodiment, the methods disclosed in U.S. Pat. No. 6,128,112 can also be used to perform the high-speed '1' or '0' decision of the condition determining component 342 of FIG. 5.

Embodiments of methods and apparatus in accordance with the present invention may provide significant advantages over the prior art. In one aspect, by monitoring the level of noise in the optical signal and controlling the receiver accordingly, optical systems in accordance with the present invention may provide significantly improved performance over alternate systems. For example, using a noise-feedback controlled control circuit as described above, an APD may be more effectively utilized in a wider range of environments, including those which exhibit significant variations in temperature such as some aerospace environments. Because the noise in the output of the APD may be monitored and utilized to adjust the input gain of the APD, the performance of the APD may be more effectively utilized by operating the APD near its limit of performance while substantially reducing or eliminating avalanche breakdown and corresponding signal interruption. Thus, optical systems in accordance with the present invention may provide improved output, as well as improved reliability.

Additional advantages may also be realized throughout the optical system in accordance with the present invention. For example, by enabling the robust usage of APD's at a plurality of connections (e.g. at bulkheads) throughout the entire optical system, significant improvement in an aircraft link budget may be realized. In one representative example, an improvement of 10 dB or more may be realized in an aircraft link budget. Link margin deficiency is currently one of the primary impediments to implementing high-speed optical networks on aircraft. Thus, embodiments of the present invention may significantly improve the link budgets on aircraft, thereby enabling increased usage of optical systems on aircraft and in other applications as well. Also, because the APD provides internal gain that may result in several dB of signal-to-noise (S/N) improvement, the improvement in the link budget may make possible the use of several additional connectors. The additional S/N provided by embodiments of the present invention may also make possible the use of other lossy components, such as optical switches.

Finally, embodiments of apparatus and methods in accordance with the present invention provide improved methods of achieving photodiode gain control. For example, there is no need to measure or monitor the temperature of the surrounding environment, and embodiments of the present invention provide increased dynamic range of the photodiode. In one particular aspect, by decreasing APD gain when the optical signal is high, the embodiments of apparatus and methods in accordance with the present invention perform a function which conventional temperature compensation circuits cannot achieve.

Figure 7:
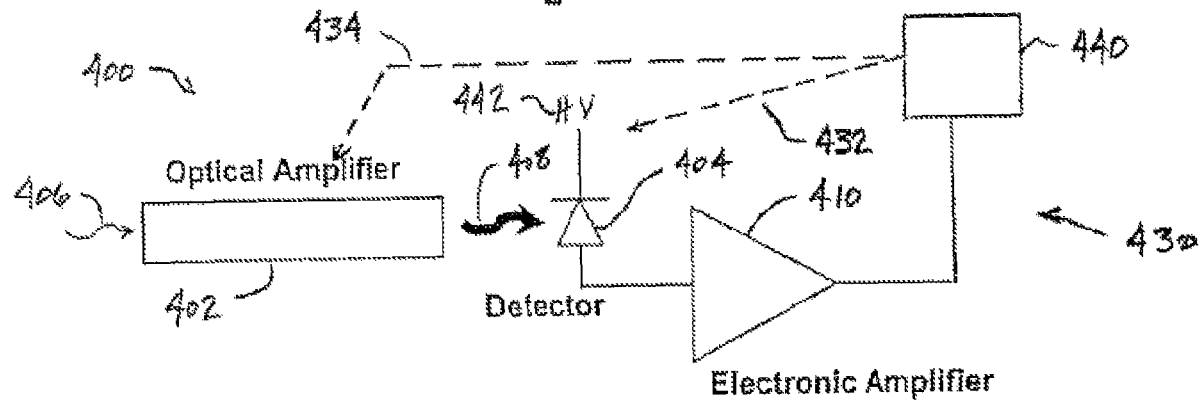
FIG. 7 is a schematic view of a fiber optic system in accordance with yet another embodiment of the present invention.

It may be appreciated that the teachings of the present invention may be applied to other components of the optical system, and that the invention is not limited to the exemplary embodiments described above. For example, FIG. 7 is a schematic view of an optical system 400 in accordance with yet another embodiment of the present invention. In this embodiment, the optical system 400 includes an optical amplifier 402 positioned ahead of a detector 404. An electronic amplifier 410 is coupled downstream of the detector 404. The optical system 400 further includes a control circuit 430 that includes a monitoring component 440. The control circuit 430 provides a first feedback loop 432 to controllably adjust the input gain (HV) 442 to the detector 404, or a second feedback loop 434 to control the amplification of the optical amplifier 402, or both.

In operation, the optical amplifier 402 receives an input signal 406, and transmits an amplified signal 408 to the detector 404. The optical amplifier 402 boosts the input signal 406 so that it produces a relatively large current in the detector 404 upon conversion from light to electrical energy. In this way, the resulting electrical signal can be made much larger than the noise currents occurring mainly in the electronic amplifier 410. Thus, the optical amplifier 402 serves a purpose that is similar to the Avalanche Photodiode (APD) described above. In the case of the APD, however, the additional amplification occurs after the conversion from optical to electrical energy but, like the optical amplifier 402, precedes the noise of the electronic amplifier 410 and thus allows an improvement in the Signal-to-Noise Ratio (SNR) which results in better communications reliability (e.g. the Bit Error Rate is improved). Conversely, in the case of the optical amplifier 402 shown in FIG. 7, the additional amplification occurs prior to the conversion from optical to electrical energy.

Typically, the optical amplifier 402, like the APD, may exhibit noise with amplitude that is signal dependent. In the case of the optical amplifier 402, this signal-dependent component may occur as the result of interaction between signal photons and spontaneous emission photons, as described more fully, for example, in *Lightwave Systems With Optical Amplifiers*, by N. A. Olsson, published in the Journal of Lightwave Technology, Vol. 7, No. 7, July, 1989. As with the APD, there may be an excess noise factor that may cause such noise to increase with gain at a somewhat higher rate than the signal itself, thereby degrading the SNR at highest gain levels. Therefore, in alternate embodiments of the present invention, noise-feedback control circuit 430 of the type described above with reference to FIGS. 1, 5, and 6 may be operatively coupled to the various components of the optical system 400 to monitor the noise level of an output signal (e.g. from the detector 404 or from the electronic amplifier 410) and to adjust the amplification of the optical amplifier 402 or the gain of the detector 404 (or both).

Figure 8:
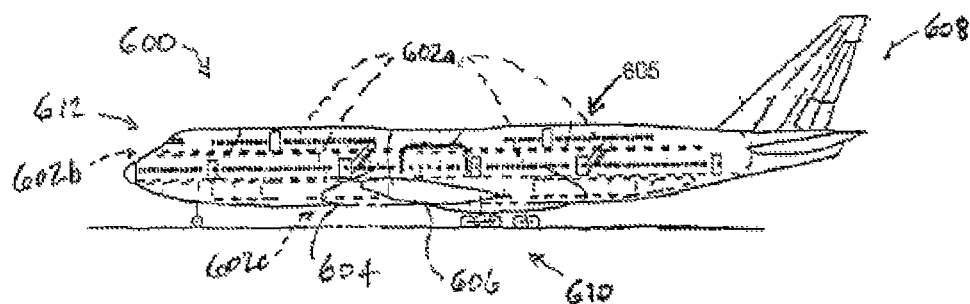
FIG. 8 is a side elevational view of an aircraft having one or more fiber optic systems or system components in accordance with a further embodiment of the present invention.

It will be appreciated that a wide variety of apparatus may be conceived that incorporate optical systems having noise-feedback control in accordance with various embodiments of the present invention. For example, FIG. 8 is a side elevational view of an aircraft 600 having one or more optical systems 602 in accordance with the present invention. In general, except for the optical systems 602, the various components and subsystems of the aircraft 600 may be of known construction and, for the sake of brevity, will not be described in detail herein. As shown in FIG. 8, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. The aircraft 600 shown in FIG. 8 is generally representative of a commercial passenger aircraft, including, for example, the 737, 747, 757, 767, and 777 models commercially-available, from The Boeing Company. The inventive apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

It may also be appreciated that embodiments of the present invention may be incorporated in other types of aerospace vehicles, including, for example, a planetary probe, a satellite or other types of spacecraft. In further embodiments, embodiments of the present invention may be incorporated into a wide variety of vehicles, including land, sea, and undersea vehicles, such as automobiles, trains, ships, submarines, submersibles, or any other suitable vehicle type.

With continued reference to FIG. 8, the aircraft 600 may include one or more embodiments of optical systems 602a that operate at connections across bulkheads within the airframe and/or fuselage of the aircraft structure. Similarly, the aircraft 600 may include one or more noise-feedback controlled optical systems 602b incorporated into the flight control system 612, and one or more noise-feedback controlled optical systems 602c for controlling the propulsion units 604, including, for example and not by way of limitation, those optical systems described in U.S. Pat. No. 5,809,220 issued to Morrison et al., U.S. Pat. No. 6,369,897 B1 issued to Rice et al., U.S. Pat. No. 6,266,169 B1 issued to Tomooka et al., U.S. Pat. No. 5,653,174 issued to Halus, U.S. Pat. No. 5,295,212 issued to Morton et al., U.S. Pat. No. 5,222,166 issued to Weltha, and U.S. Pat. No. 5,119,679 issued to Frisch. Clearly, a wide variety of optical systems 602 in accordance with the present invention may be conceived for incorporation into the various subsystems of the aircraft 600.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus operable in an environment exhibiting significant variation in temperature, the apparatus comprising:
    an optical signal transmitter; and
    an optical signal receiver for receiving an optical signal from the transmitter, the receiver including a photodiode for converting the optical signal to an electrical signal;
    the receiver further including a feedback loop for monitoring the electrical signal outputted by the photodiode, computing a ratio of noise energy for high and low signal in the monitored signal, using the ratio to determine when temperature-induced breakdown is imminent, and adjusting gain of the photodiode as a function of the ratio to prevent breakdown;
    wherein the feedback loop adjusts the gain without using measured temperature of the environment.

2. The apparatus of claim 1, wherein the feedback loop adjusts at least one of an amplification of the transmitter and the gain of the photodiode to maintain a desired RMS level of the electrical signal.

3. The apparatus of claim 1, wherein the receiver further includes an integrate-and-dump circuit that integrates an energy value of the noise over a bit interval.

4. The apparatus of claim 3, wherein the receiver further includes a subtractor component that receives a state indicator signal and subtracts a high-state +A or a low-state −A state from the electrical signal based on the state indicator signal.

5. The apparatus of claim 4, wherein the receiver further includes a squaring function that squares an output from the subtractor component and transmits the squared output to the integrate-and-dump circuit.

6. The apparatus of claim 1, wherein the feedback loop includes a state means calculation component configured to compute at least one of a high state means and a low state means of the electrical signal.

7. The apparatus of claim 1, wherein computing noise in the electrical signal includes receiving a state indicator signal that indicates a condition of the optical signal, and subtracting a high-state +A or a low-state −A state from the electrical signal based on the state indicator signal.

8. The apparatus of claim 1, wherein the photodiode is an avalanche photodiode; and wherein the feedback loop computes a ratio of high- and low-states to prevent breakdown of the photodiode and possible interruption of the receiver.

9. The apparatus of claim 8, wherein the feedback loop includes:
    a high energy calculation component configured to compute an average energy for a high-state A;
    a low energy calculation component configured to compute an average energy for a low-state −A; and
    a comparator configured to compare a ratio of the average energies for the high- and low-states A, −A with a predetermined threshold, the threshold indicating that the temperature-induced breakdown of the photodiode is imminent.

10. The apparatus of claim 8, wherein the ratio is a ratio of an average energy of a high-state A of the electrical signal and an average energy of a low-state A of the electrical signal is greater than a predetermined threshold, the threshold indicating that the temperature-induced breakdown of the photodiode is imminent.

11. An optical system, comprising:
    a transmitter configured to transmit an optical signal;
    a receiver including an avalanche photodiode configured to receive the optical signal and to output an electrical signal; and
    a feedback loop for increasing dynamic range of the receiver when an optical signal is high and preventing temperature-induced breakdown of the avalanche photodiode, the feedback loop
    monitoring a noise level of at least a portion of the electrical signal including determining a presence or absence of the optical signal at the receiver, computing at least one of a high state means and a low state means of the electrical signal, computing an average noise energy for the high-state A, computing an average noise energy for the low-state −A, and computing a ratio of the average noise energies for the high- and low-states A, −A, and preventing temperature-induced breakdown, including using the ratio as an indicator of temperature-induced breakdown, and reducing at least one of an optical amplification of the transmitter and a gain of the receiver when the ratio is greater than a predetermined threshold, the threshold indicating that breakdown of the photodiode is imminent.

12. The optical system of claim 11, wherein the transmitter includes an optical amplifier.

13. The optical system of claim 11, wherein the feedback loop adjusts at least one of an amplification of the transmitter and gain of the receiver to maintain a desired RMS level of the electrical signal.

14. An aircraft comprising:
a fuselage;
a propulsion system operatively coupled to the fuselage; and
an optical system configured to transmit signals, the optical system including:
a transmitter configured to transmit an optical signal, the transmitter including an optical amplifier;
a receiver configured to receive the optical signal and to output an electrical signal; and
a monitoring component to provide a feedback loop to increase a dynamic range of the receiver when an optical signal is high without measuring a temperature of the surrounding environment of the receiver, the monitoring component to:
monitor a noise level of at least a portion of the electrical signal, and
reduce at least one of an amplification of the transmitter and a gain of the receiver when a ratio of an average energy of a high-state A of the electrical signal and an average energy of a low-state A of the electrical signal is greater than a predetermined threshold, the threshold value being at a point where a breakdown voltage of the receiver is eminent.

15. The aircraft of claim 14, wherein the receiver includes an avalanche photodiode.

16. The aircraft of claim 14, wherein the monitoring component is configured to monitor an output voltage of the electrical signal and to adjust at least one of an amplification of the transmitter and a gain of the receiver to maintain a desired RMS level of the electrical signal.

17. The aircraft of claim 14, wherein the monitoring component includes a noise energy calculation component configured to calculate a noise level of at least a portion of the electrical signal.

18. The aircraft of claim 14, wherein the monitoring component includes:
a high energy calculation component configured to compute an average noise energy for the high-state A;
a low energy calculation component configured to compute an average noise energy for the low-state −A; and
a comparator configured to compare a ratio of the average noise energies for the high- and low-states A, −A with a predetermined threshold.

19. The aircraft of claim 14, wherein the monitoring component includes:
a condition determining component configured to determine at least one of a presence or an absence of light at the receiver;
a state means calculation component configured to compute at least one of a high state means and a low state means of the electrical signal;
a high energy calculation component configured to compute an average noise energy for the high-state A;
a low energy calculation component configured to compute an average noise energy for the low-state −A; and
a comparator configured to compare a ratio of the average noise energies for the high- and low-states A, −A with a predetermined threshold.

20. A method comprising:
receiving an optical signal in an environment exhibiting significant variation in temperature;
using a photodiode to convert the optical signal to a corresponding electrical signal;
monitoring the electrical signal outputted by the photodiode;
computing a ratio of noise energy for high and low signal in the monitored signal;
using the ratio as an indicator of imminent temperature-induced breakdown of the photodiode; and
preventing breakdown of the photodiode by adjusting gain of the photodiode without monitoring the temperature of surrounding environment when the ratio indicates that temperature-induced breakdown is imminent.

21. The method of claim 20, wherein computing the ratio of noise energy includes:
computing an average energy for a high-state A of the electrical signal;
computing an average energy for the low-state −A of the electrical signal; and
computing a ratio of the average energies for the high- and low-states A, −A.

22. The method of claim 21, wherein an avalanche photodiode is used to convert the optical signal, and wherein the ratio is compared to a breakdown threshold of the avalanche photodiode.

23. The method of claim 21, wherein computing the noise in the electrical signal includes integrating a noise energy value over a bit interval.

24. The method of claim 21, wherein the gain is reduced when the ratio of the average energy of the high-state A and the average energy of the low-state A is greater than a predetermined threshold.

25. The method of claim 21, further comprising determining at least one of a presence or an absence of light at the receiver prior to computing the average energies.

* * * * *